US010652580B2

(12) United States Patent
Shi et al.

(10) Patent No.: US 10,652,580 B2
(45) Date of Patent: May 12, 2020

(54) VIDEO DATA PROCESSING METHOD AND APPARATUS

(71) Applicant: TENCENT TECHNOLOGY (SHENZHEN) COMPANY LIMITED, Shenzhen (CN)

(72) Inventors: Yongfang Shi, Shenzhen (CN); Anlin Gao, Shenzhen (CN); Chao Dai, Shenzhen (CN); Jing Lv, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/204,546

(22) Filed: Nov. 29, 2018

(65) Prior Publication Data
US 2019/0098339 A1 Mar. 28, 2019

Related U.S. Application Data

(63) Continuation of application No. PCT/CN2017/092178, filed on Jul. 7, 2017.

(30) Foreign Application Priority Data

Jul. 7, 2016 (CN) .......................... 2016 1 0531620

(51) Int. Cl.
H04N 19/65 (2014.01)
H04N 19/31 (2014.01)
(Continued)

(52) U.S. Cl.
CPC .......... H04N 19/65 (2014.11); H04N 19/102 (2014.11); H04N 19/132 (2014.11);
(Continued)

(58) Field of Classification Search
CPC .... H04N 19/65; H04N 19/187; H04N 19/159; H04N 19/172; H04N 19/164;
(Continued)

(56) References Cited

U.S. PATENT DOCUMENTS

2008/0225735 A1 9/2008 Qiu et al.
2011/0271163 A1 11/2011 Le Floch et al.
(Continued)

FOREIGN PATENT DOCUMENTS

CN 101662672 A 3/2010
CN 101729910 A 6/2010
(Continued)

OTHER PUBLICATIONS

The World Intellectual Property Organization (WIPO) International Search Report for PCT/CN2017/092178 dated Sep. 29, 2017 7 Pages (including translation).
(Continued)

Primary Examiner — Christopher S Kelley
Assistant Examiner — Nasim N Nirjhar
(74) Attorney, Agent, or Firm — Anova Law Group, PLLC

(57) ABSTRACT

Video data processing method and apparatus are provided. The method includes: encoding, by an encoder side, obtained original video data according to a hierarchical P-frame prediction HPP structure to obtain an HPP bitstream; redundancy-coding the HPP bitstream according to a forward error correction FEC code, redundancy packet quantities in frames in the HPP bitstream progressively decreasing from lower to higher temporal layers to which the frames belong in the HPP structure; and sorting the frames in the redundancy-coded HPP bitstream and sequentially sending the frames in the redundancy-coded HPP bitstream to a decoder side.

8 Claims, 8 Drawing Sheets

(51) Int. Cl.

| | |
|---|---|
| *H04N 19/187* | (2014.01) |
| *H04N 19/159* | (2014.01) |
| *H04N 19/172* | (2014.01) |
| *H04N 19/164* | (2014.01) |
| *H04N 19/132* | (2014.01) |
| *H04N 19/102* | (2014.01) |
| *H04N 19/67* | (2014.01) |

(52) U.S. Cl.
CPC ......... *H04N 19/159* (2014.11); *H04N 19/164* (2014.11); *H04N 19/172* (2014.11); *H04N 19/187* (2014.11); *H04N 19/31* (2014.11); *H04N 19/67* (2014.11)

(58) Field of Classification Search
CPC .... H04N 19/132; H04N 19/102; H04N 19/67; H04N 19/31
See application file for complete search history.

(56) References Cited

U.S. PATENT DOCUMENTS

| | | | |
|---|---|---|---|
| 2011/0299591 A1 | 12/2011 | Chen et al. | |
| 2012/0013748 A1* | 1/2012 | Stanwood | H04L 41/5022 348/192 |
| 2012/0183076 A1* | 7/2012 | Boyce | H04N 19/105 375/240.25 |
| 2013/0070859 A1* | 3/2013 | Lu | H04N 19/39 375/240.25 |
| 2013/0346831 A1 | 12/2013 | Ha et al. | |
| 2015/0237377 A1* | 8/2015 | Hendry | H04N 19/70 375/240.25 |
| 2016/0065978 A1* | 3/2016 | Hiwatashi | H04N 19/31 375/240.02 |
| 2017/0142433 A1* | 5/2017 | Gu | H04N 19/44 |

FOREIGN PATENT DOCUMENTS

| | | |
|---|---|---|
| CN | 103139559 A | 6/2013 |
| CN | 103260033 A | 8/2013 |
| CN | 104125464 A | 10/2014 |
| CN | 104620525 A | 5/2015 |
| CN | 105009591 A | 10/2015 |
| WO | 2014005077 A1 | 1/2014 |

OTHER PUBLICATIONS

The State Intellectual Property Office of the People's Republic of China (SIPO) Office Action 1 for 201610531620.7 dated May 29, 2019 10 Pages (including translation).

The European Patent Office (EPO) The partial supplementary European Search Report for 17823673.3 dated Jan. 16, 2020 13 pages.

The European Patent Office (EPO) The Extended European Search Report for 17823673.3 dated Mar. 13, 2020 13 pages.

Danny Hong et al., "H.264 Hierarchical P Coding in the Context of Ultra-Low Delay, Low Complexity Applications", Picture Coding Symposium 2010, Dec. 8, 2010, figure 2, pp. 146-148 Total 4 pages.

Rahul Vanam et al.,"Error-resilient video coding for wireless video telephony applications", Proceedings of SPIE. vol. 8499, Oct. 15, 2014, pp. 84991N-1-84991N-9, p. 2 Total 9 pages.

* cited by examiner

VIDEO DATA PROCESSING METHOD AND APPARATUS

RELATED APPLICATIONS

The application is a continuation application of PCT Patent Application No. PCT/CN2017/092178, filed on Jul. 7, 2017, which claims priority to China Patent Application No. 201610531620.7, filed with the Chinese Patent Office on Jul. 7, 2016 and entitled "VIDEO DATA PROCESSING METHOD AND APPARATUS", all of which is incorporated herein by reference in their entirety.

FIELD OF THE TECHNOLOGY

The present disclosure relates to the field of video data processing technologies, and more particularly, relates to video data processing methods and apparatus.

BACKGROUND OF THE DISCLOSURE

In recent years, with the development of smartphones and mobile Internet, a VoIP (Video/voice over Internet Protocol, an IP network-based audio and video data real-time transmission application) video call application provides brand new communication experience to users. Video lag and jitter may occur due to signal fading and burst packet loss, affecting video quality.

An IPPP coding architecture is usually used in a conventional video compression and coding standard. Under such architecture, frames of video data are divided into two types. One type is an I frame (I frame, also referred to as an intra-frame coded frame), and the other type is a P frame (P frame, also referred to as an inter-frame coded frame or forward prediction coded frame). Referring to FIG. 1, FIG. 1 is a schematic structural diagram of an IPPP coding structure. The IPPP coding architecture is a chain reference structure. Whether frames of video data can be successfully decoded depends on not only integrity of data of the frames but also whether reference frames are solved. In the IPPP coding architecture, the I frame can be independently decoded with reference to no frame, and the P frame can be successfully decoded with reference to a reference frame thereof. In the IPPP coding architecture, a GOP (Group of Picture, a smallest repeating unit of video encoding) is separated by the I frame. Failure of decoding of any frame in the GOP leads to that all frames after the frame in the GOP cannot successfully decoded, causing video lags.

As such, the existing technology provides an HPP (Hierarchical P-frame Prediction) structure coding manner. Referring to the HPP coding structure shown in FIG. 2, frames in different temporal layer (TL) have different importance and can alleviate a reference coupling relationship between adjacent frames to some extent. As shown in FIG. 2, in the HPP structure, a frame in a higher TL is with respect to a frame in a lower TL, and adjacent frames are in different TLs. Therefore, unless a frame in a lowest TL is lost, following frames all may be successfully decoded. For example, a P5 frame is lost, and this does not affect successful decoding of following P6, P7, and P8 frames.

The HPP coding manner alleviates the reference coupling relationship between adjacent frames to some extent. When packet loss occurs, a problem arises that some frames cannot be successfully decoded, causing video lag still occurs at a decoder side.

SUMMARY

In view of the above, the present disclosure provides video data processing methods and apparatus, so as to resolve a problem in an existing HPP coding manner that a decoder side cannot decode some frames when data transmission packet loss occurs.

A video data processing method is provided, applied to an encoder side, the method including: obtaining original video data; encoding the original video data according to a hierarchical P-frame prediction (HPP) structure to obtain an HPP bitstream, the HPP bitstream corresponding to different temporal layers, frames in higher temporal layers being decoded with reference to frames in lower temporal layers, and neighboring frames being in different layers; redundancy-coding the HPP bitstream according to a forward error correction FEC code, redundancy packet quantities in frames in the HPP bitstream progressively decreasing from lower to higher temporal layers to which the frames belong in the HPP structure; and sorting the frames in the redundancy-coded HPP bitstream and sequentially sending the sorted frames to a decoder side.

A non-transitory computer readable storage medium storing computer program instructions is provided. When being executed by a processor on a decoder side, the computer program instructions cause the processor to perform: receiving a current frame sent by an encoder side, the current frame being a frame in a hierarchical P-frame prediction HPP bitstream obtained through coding by the encoder side according to an HPP structure, the HPP bitstream corresponding to different temporal layers, frames in higher temporal layers being decoded with reference to frames in lower temporal layers, and neighboring frames being in different layers; determining whether a reference frame of the current frame is complete, when it is determined that the current frame is an inter-frame coded frame P frame; discarding the current frame to cancel decoding of the current frame, when the reference frame of the current frame is incomplete; determining, according to a location of the current frame in the HPP structure, a target frame using the current frame as the reference frame; and marking a reference status of the target frame as an incomplete reference frame.

A video data processing method is provided, applied to a decoder side, the method including: receiving a current frame sent by an encoder side, the current frame being a frame in a hierarchical P-frame prediction HPP bitstream obtained through coding by the encoder side according to an HPP structure, the HPP bitstream corresponding to different temporal layers, frames in higher temporal layers being decoded with reference to frames in lower temporal layers, and neighboring frames being in different layers; determining whether a reference frame of the current frame is complete, when it is determined that the current frame is an inter-frame coded frame P frame; discarding the current frame to cancel decoding of the current frame, when the reference frame of the current frame is incomplete; determining, according to a location of the current frame in the HPP structure, a target frame using the current frame as the reference frame; and marking a reference status of the target frame as an incomplete reference frame.

A video data processing apparatus is provided, applied to an encoder side, the apparatus including: a memory, configured to store program for a video data processing method, applied to the encoder side; and a processor, coupled to the memory and, when executing the program, configured to: obtain original video data; encode the original video data according to a hierarchical P-frame prediction (HPP) structure to obtain an HPP bitstream, the HPP bitstream corresponding to different temporal layers, frames in higher temporal layers being decoded with reference to frames in lower temporal layers, and neighboring frames being in different layers; a redundancy-code the HPP bitstream according to a forward error correction FEC code, redundancy packet quantities in frames in the HPP bitstream progressively decreasing from lower to higher temporal layers to which the frames belong in the HPP structure; and sort the frames in the redundancy-coded HPP bitstream and sequentially send the sorted frames to a decoder side.

A video data processing apparatus is provided, applied to a decoder side, the apparatus including: a current frame receiving unit, configured to receive a current frame sent by an encoder side, the current frame being a frame in a hierarchical P-frame prediction HPP bitstream obtained through coding by the encoder side according to an HPP structure, the HPP bitstream corresponding to different temporal layers, frames in higher temporal layers being decoded with reference to frames in lower temporal layers, and neighboring frames being in different layers; a reference frame determining unit, configured to determine whether a reference frame of the current frame is complete, when it is determined that the current frame is an inter-frame coded frame P frame; a first frame discarding unit, configured to discard the current frame to cancel decoding of the current frame, when the reference frame determining unit determines that the reference frame of the current frame is incomplete; a target frame determining unit, configured to determine, according to a location of the current frame in the HPP structure, a target frame using the current frame as the reference frame; and a first reference status marking unit, configured to mark a reference status of the target frame as an incomplete reference frame.

In the video data processing method and apparatus provided in embodiments of the present disclosure, the encoder side encodes obtained original video data according to a hierarchical P-frame prediction HPP structure to obtain an HPP bitstream, redundancy-codes the HPP bitstream according to a forward error correction FEC code, redundancy packet quantities in frames in the HPP bitstream decreasing from lower to higher temporal layers to which the frames belong in the HPP structure, and at last, sequentially sends the frames in the redundancy-coded HPP bitstream to a decoder side. It can be learned from the above that in the present disclosure, the HPP coding structure is combined with FEC redundancy coding, and a redundancy packet is added to the HPP bitstream encoded according to the HPP coding structure. In addition, when redundancy packets are added, more redundancy packets are added to frames in lower temporal layers in the HPP structure, frames that are in lower temporal layers and that are of high importance are especially protected. In this manner, even if partial packet loss occurs in a data transmission process, the decoder side can also perform packet loss recovery by using the redundancy packet, thereby greatly improving a decoding success rate and reducing a video lag time.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some embodiments of the present disclosure rather than all of the embodiments. All other embodiments obtained by persons skilled in the art based on the embodiments of the present disclosure without creative efforts shall fall within the protection scope of the present disclosure.

Figure 1:
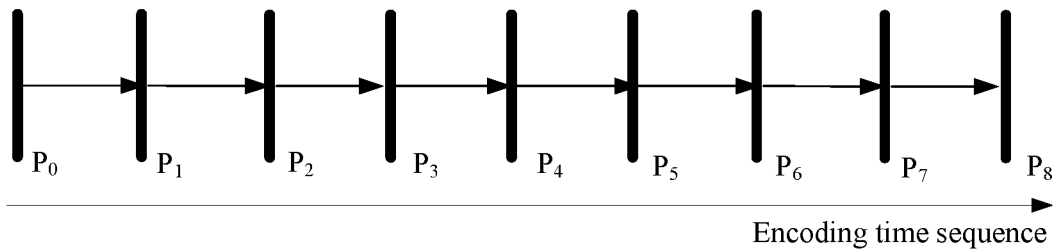
FIG. 1 is a schematic structural diagram of IPPP coding.
Figure 2:
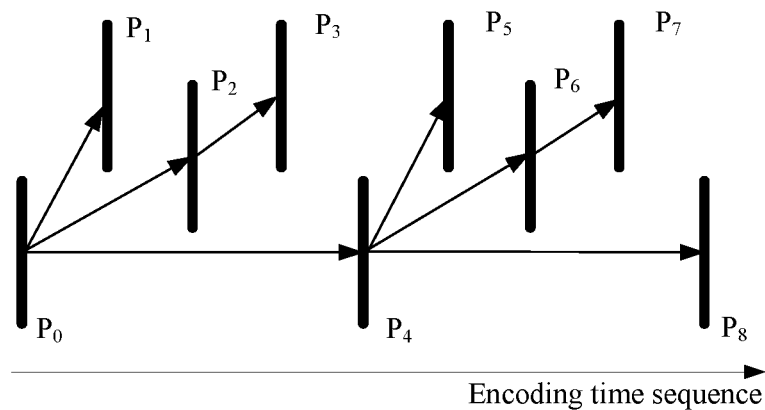
FIG. 2 is a schematic structural diagram of HPP coding.

In a video data processing solution of the present disclosure, a decoder side receives a video packet sent by an encoder side, so as to process video data. The video encoder side uses an HPP coding structure. The video encoder side collects an original video data stream, performs source compression and coding in a form of an image sequence, and at last, generates an HPP bitstream. When performing HPP coding, the encoder side may configures, according to hardware performance and a use scenario of the encoder side, the maximum layer quantity as M+1 and the maximum reference distance as $L=2^{\wedge}M$ in the HPP structure. As shown in FIG. 2, M=2, that is, in a three-layer HPP reference structure, a frame in a higher temporal layer TL refers to a frame in a lower temporal layer TL. L=4, the maximum reference distance corresponds to that P refers to P0, and P8 refers to P4.

Further, based on the source HPP video coding, to cope with packet loss, the video encoder side redundancy-codes the HPP bitstream by using a forward error correction FEC code and sequentially sends frames in the redundancy-coded HPP bitstream to the decoder side.

A method for adding a redundancy packet to the HPP bitstream may be: first, packet-dividing each frame of the HPP bitstream, dividing data of each frame into p video packets, then adding q redundancy packets to the frame by using a forward error correction (FEC) code, and at least, transmitting the video packets and the redundancy packets in the frame to the decoder side. The method can resist packet loss of the q video packets. When a packet is lost, a redundancy packet may be used to recover the lost video packet. q and p are both positive integers. It should be noted that the quantity of added redundancy packets decides a loss resistance capability. Relatively many redundancy packets may be added to packets that are important and that need to be especially protected.

Based on the HPP coding structure, a frame in a higher temporal layer refers to a frame in a lower TL. Therefore, a frame in a lower temporal layer has a higher importance level. In the present disclosure, redundancy packets in frames in lower temporal layers may be set to be more than those in higher temporal layers. For example, 100% redundancy packets are set for frames in a TL0 layer, that is, the quantity of video packets is equal to that of redundancy packets; 50% redundancy packets are set for frames in a TL1 layer . . . , no redundancy packet is set for frames in the highest TL layer.

Figure 3:
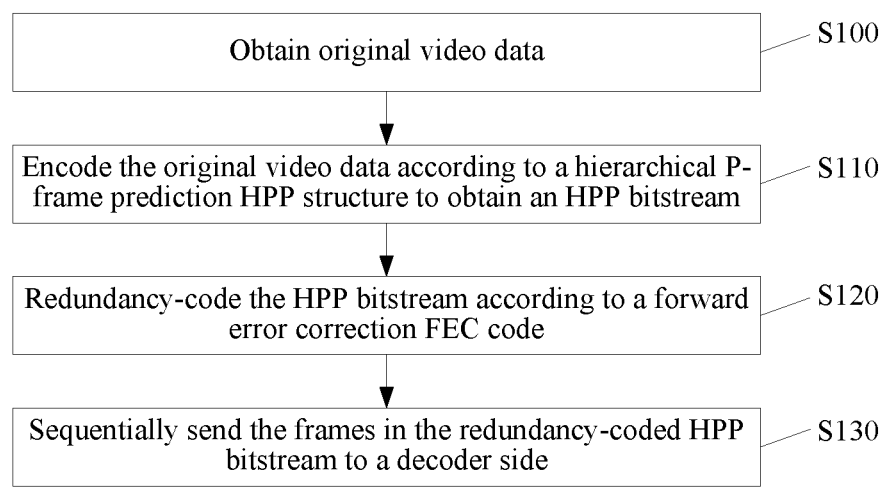
FIG. 3 is a flowchart of a video data processing method applied to an encoder side according to an embodiment of the present disclosure.

In the following, in the embodiments of the present disclosure, a video data processing process is described from the perspective of the encoder side. Referring to FIG. 3, FIG. 3 is a flowchart of a video data processing method applied to an encoder side according to an embodiment of the present disclosure.

As shown in FIG. 3, the method includes:

Step S100: Obtaining original video data.

Step S110: Encoding the original video data according to a hierarchical P-frame prediction HPP structure to obtain an HPP bitstream.

For example, according to hardware performance and a use scenario of the encoder side, the maximum layer quantity may be configured as M+1 and the maximum reference distance may be configured as $L=2^M$ in the HPP structure.

Step S120: Redundancy-coding the HPP bitstream according to a forward error correction FEC code.

For example, when the HPP bitstream is redundancy-coded, redundancy packet quantities in frames in the HPP bitstream may decrease from lower to higher temporal layers to which the frames belong in the HPP structure.

Because, importance of frames in lower temporal layers is higher than that of frames in higher temporal layers in the HPP structure, redundancy packet quantities of the frames in lower temporal layers are greater than those of the frames in higher temporal layers, so that limited redundancy packet resources can be used to protect frames with higher importance, thereby improving a redundancy utilization rate.

Step S130: Sequentially sending the frames in the redundancy-coded HPP bitstream to a decoder side.

The encoder side sequentially sends the frames to the decoder side according to time sequences of the frames in the HPP bitstream.

In the video data processing method and apparatus provided in the present disclosure, the encoder side encodes obtained original video data according to a hierarchical P-frame prediction (HPP) structure to obtain an HPP bitstream, redundancy-codes the HPP bitstream according to a forward error correction FEC code, redundancy packet quantities in frames in the HPP bitstream decreasing from lower to higher temporal layers to which the frames belong in the HPP structure, and at last, sequentially sends the frames in the redundancy-coded HPP bitstream to a decoder side. It can be learned from the above that in the present disclosure, the HPP coding structure is combined with FEC redundancy coding, and a redundancy packet is added to the HPP bitstream encoded according to the HPP coding structure. In addition, when redundancy packets are added, more redundancy packets are added to frames in lower temporal layers in the HPP structure, frames that are in lower temporal layers and that are of high importance are especially protected. In this manner, even if partial packet loss occurs in a data transmission process, the decoder side can also perform packet loss recovery by using the redundancy packet, thereby greatly improving a decoding success rate and reducing a video lag time.

Figure 4:
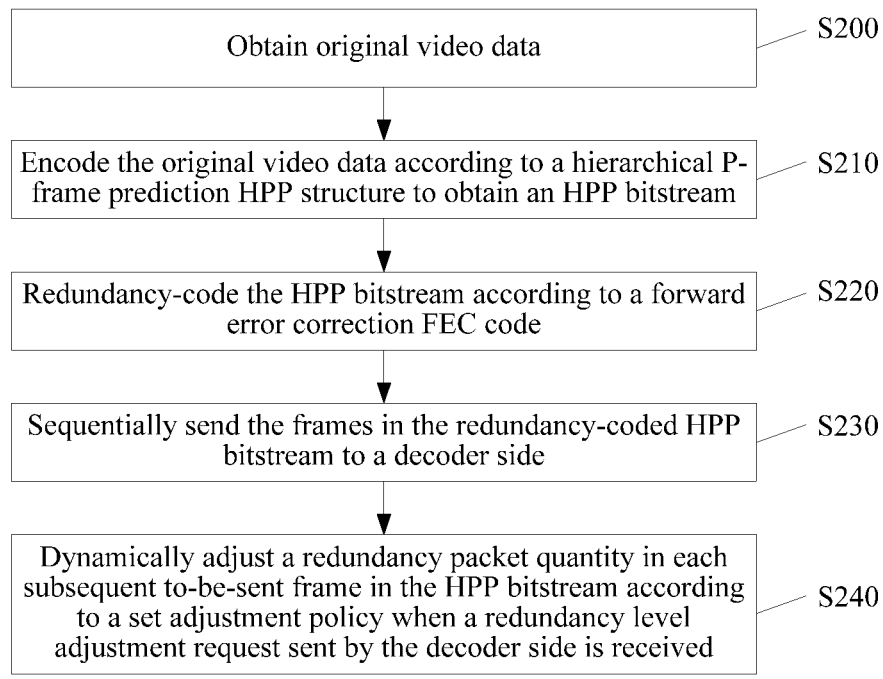
FIG. 4 is a flowchart of another video data processing method applied to an encoder side according to an embodiment of the present disclosure.

FIG. 4 is a flowchart of another video data processing method applied to an encoder side according to an embodiment of the present disclosure.

As shown in FIG. 4, the method includes:

Step S200: Obtaining original video data.

Step S210: Encoding the original video data according to a hierarchical P-frame prediction HPP structure to obtain an HPP bitstream.

Step S220: Redundancy-coding the HPP bitstream according to a forward error correction FEC code.

For example, when the HPP bitstream is redundancy-coded, redundancy packet quantities in frames in the HPP bitstream may decrease from lower to higher temporal layers to which the frames belong in the HPP structure.

Step S230: Sequentially sending the frames in the redundancy-coded HPP bitstream to a decoder side.

Step S240: Dynamically adjusting a redundancy packet quantity in each subsequently to-be-sent frame in the HPP bitstream according to a set adjustment policy when a redundancy level adjustment request sent by the decoder side is received.

The redundancy level adjustment request is a request generated by the decoder side when the decoder side performs an integrity check on a video packet in a received current frame and determines according to the check result that the current frame cannot be decoded.

In an exemplary embodiment, when a network status is bad, and as a result, data packets in frames received by the decoder side have a serious loss situation, the decoder side may send the redundancy level adjustment request to the encoder side, and the encoder side improves the redundancy packet quantity in each subsequently to-be-sent frame in the HPP bitstream.

Optionally, the process of dynamically adjusting a redundancy packet quantity in each subsequently to-be-sent frame in the HPP bitstream according to a set adjustment policy may for example include:

adjusting a redundancy packet quantity in each frame that belongs to a set temporal layer in the HPP bitstream; or adjusting a redundancy packet quantity in each frame that belongs to each temporal layer in the HPP bitstream according to a redundancy packet adjustment ratio corresponding to the temporal layer.

For example, the encoder side may only improve the redundancy packet quantity in each frame in the set temporal layer. For example, a redundancy packet quantity in a frame in a temporal layer that is less than a threshold may be increased. In addition, redundancy packet quantities in frames in temporal layers may be increased according to the same or different adjustment ratios.

For example, at the beginning, the video encoder side sets 50% redundancy packets for frames in a TL0 layer, sets 20% redundancy packets for frames in a TL1 layer, and sets 5% redundancy packets for frames in a TL3 layer.

The video encoder side receives the redundancy level adjustment request at a moment, so as to improve quantities of set redundancy packets, and sets 70% redundancy packets for the frames in the TL0 layer, sets 40% redundancy packets for the frames in the TL1 layer, and sets 20% redundancy packets for the frames in the TL3 layer.

Figure 5:
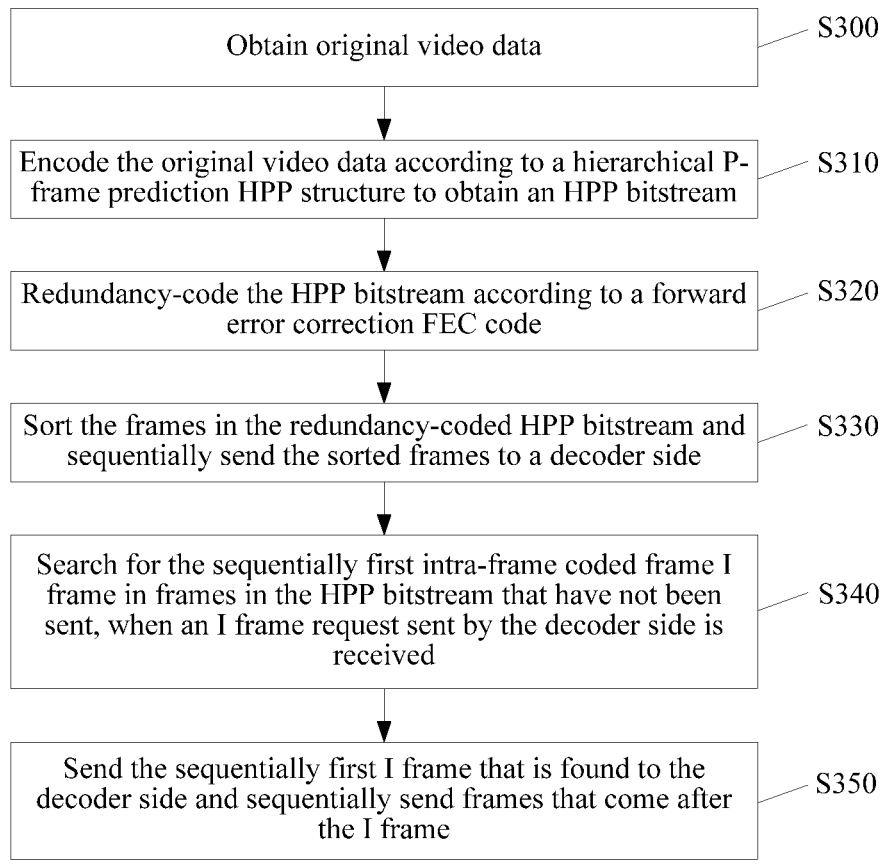
FIG. 5 is a flowchart of still another video data processing method applied to an encoder side according to an embodiment of the present disclosure.

Referring to FIG. 5, FIG. 5 is a flowchart of still another video data processing method applied to an encoder side according to an embodiment of the present disclosure.

As shown in FIG. 5, the method includes:

Step S300: Obtaining original video data.

Step S310: Encoding the original video data according to a hierarchical P-frame prediction HPP structure to obtain an HPP bitstream.

Step S320: Redundancy-coding the HPP bitstream according to a forward error correction FEC code.

For example, when the HPP bitstream is redundancy-coded, redundancy packet quantities in frames in the HPP bitstream may decrease from lower to higher temporal layers to which the frames belong in the HPP structure.

Step S330: Sorting the frames in the redundancy-coded HPP bitstream and sequentially send the sorted frames to a decoder side.

Step S340: Search for a top ranked intra-frame coded frame, I frame, among the unsent frames in the HPP bitstream, when an I frame request sent by the decoder side is received.

For example, when the encoder side determines that a current frame is in the lowest temporal layer and is incomplete, it indicates that a reference structure is broken. Frames that come after the current frame between the current I frame and a next I frame cannot be decoded because reference frames are lost. Video lag cannot be avoided in this extreme situation. To shorten a lag time, the I frame request may be directly sent to the video encoder side, to request the video encoder side to immediately send the next I frame.

When receiving the request, the encoder side searches for the top ranked I frame among the unsent frames in the HPP bitstream.

Step S350: Sending the sequentially first I frame that is found to the decoder side and sequentially send frames that come after the I frame.

After finding the sequentially first I frame, the decoder side cancels sending of frames that come before the sequentially first I frame, directly jumps to sending of the sequentially first I frame, and subsequently sequentially sends the frames that come after the sequentially first I frame.

In an exemplary embodiment, when receiving the I frame request, the encoder side immediately searches for the top ranked I frame among the unsent frames in the HPP bitstream and jumps to the sending of the top ranked I frame and subsequent frames, shortening a video lag time at the decoder side to the largest extent.

Figure 6:
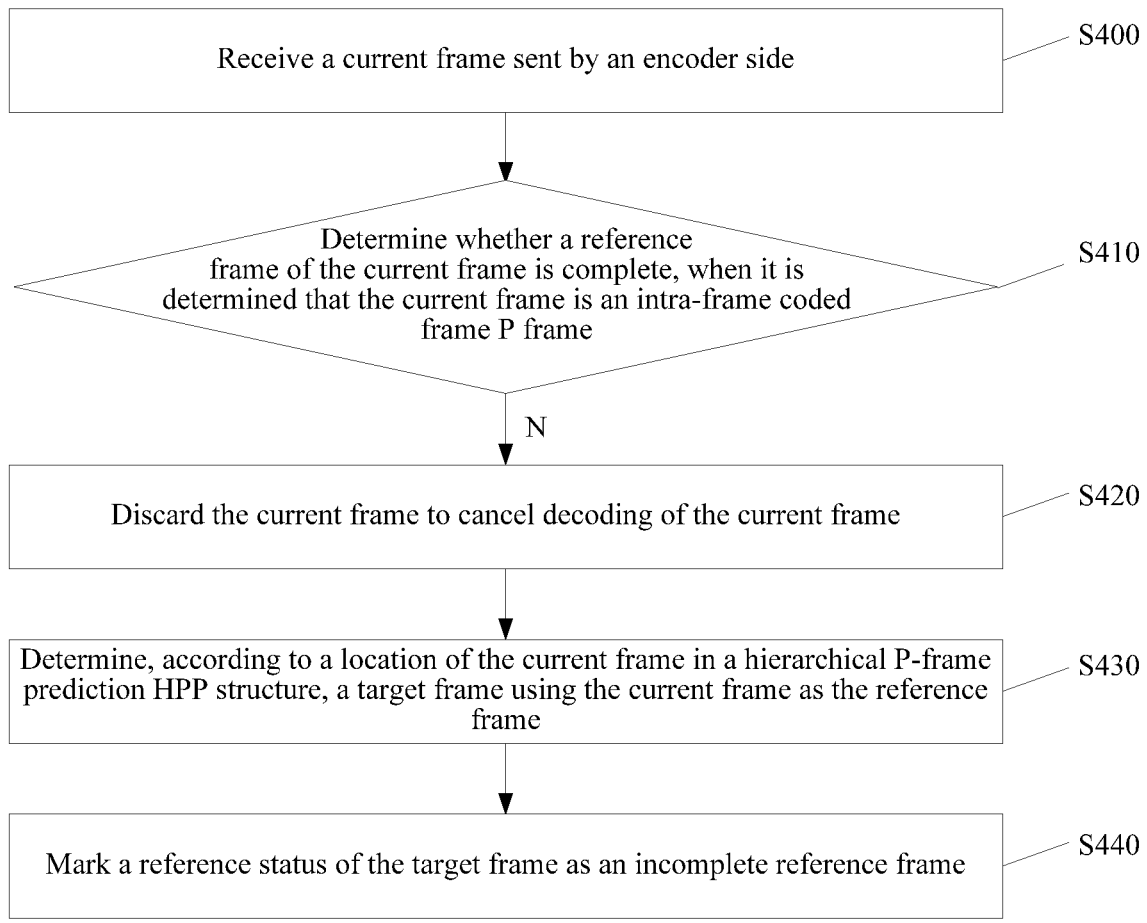
FIG. 6 is a flowchart of a video data processing method applied to a decoder side according to an embodiment of the present disclosure.

In the following, in the present disclosure, a video data processing process is described from the perspective of a receiver end. Referring to FIG. 6, FIG. 6 is a flowchart of a video data processing method applied to a decoder side according to an embodiment of the present disclosure.

As shown in FIG. 6, the method includes:

Step S400: Receiving a current frame sent by an encoder side.

The current frame is a frame in a hierarchical P-frame prediction HPP bitstream obtained through coding by the encoder side according to an HPP structure.

It may be understood that a frame includes several video packets, and header information of each video packet can record a frame to which the video packet belongs and that the frame is an $i^{th}$ frame of total n video packets in the frame. In this step, determining that the current frame is received may be determining that a first video packet in the current frame is received or determining that the last video packet in the current frame is received.

For example, a specific implementation of determining that the last video packet in the current frame is received may be:

when a video packet in an nth current frame is received, determining, according to a total quantity n of video packets in the current frame recorded in headers of the received video packets in the current frame, that the video packet is the last video packet in the current frame; or when a video packet in a next frame is received, determining that a previously received video packet is the last video packet in the current frame.

Step S410: Determining whether a reference frame of the current frame is complete, when it is determined that the current frame is an inter-frame coded frame P frame; if not, performing steps S420 to S440.

For example, when the reference frame of the current frame cannot form a complete packet or cannot be decoded, or the reference frame is incomplete, it means that the current frame cannot be successfully decoded either.

Step S420: Discarding the current frame to cancel decoding of the current frame.

Step S430: Determining, according to a location of the current frame in a hierarchical P-frame prediction HPP structure, a target frame using the current frame as the reference frame.

For example, the target frame using the current frame as the reference frame may be determined according to the HPP coding structure and the location of the current frame in the HPP structure. Referring to FIG. 2, assuming that the current frame is P2, because P3 refers to P2, it may be set that P3 is the target frame. For another example, the current frame is P4; because P5, P6, and P8 refer to P4, it may be set that P5, P6, and P8 are the target frame.

Step S440: Marking a reference status of the target frame as an incomplete reference frame.

For example, because it is determined that the reference frame of the current frame is incomplete, it indicates that the current frame cannot be successfully decoded. Therefore, the target frame using the current frame for reference cannot be successfully decoded, and the reference status of the target frame is set to an incomplete reference frame.

Optionally, in the present disclosure, different identifiers may be set to represent different reference statuses. For example, "1" represents an incomplete reference frame, and "0" represents a complete reference frame. Certainly, other identifiers may be used to represent different reference statuses.

Optionally, steps S420 and S430 may be performed reversely or in parallel. FIG. 6 merely shows an optional manner.

In an exemplary embodiment, when the decoder side determines that the received current frame is a P frame, it can be known according to the HPP coding structure that the P frame needs to refer to a previous frame. Therefore, in the present disclosure, it can be determined whether the reference frame of the current frame is complete. When the reference frame thereof is incomplete, it indicates that the current frame cannot be successfully decoded. Therefore, the current frame is directly discarded and is not decoded, thereby saving a decoding time and shortening a video lag time. Further, in the present disclosure, when the reference frame of the current frame is incomplete, the reference status of the target frame using the current frame as the reference frame is marked as an incomplete reference frame. When the target frame is subsequently received, whether the reference frame thereof is incomplete may be determined directly by using the reference status of the target frame. This is more convenient.

Optionally, the foregoing process of determining whether the reference frame of the current frame is complete may include:

1. Obtaining a reference status of the current frame, the reference status being used for indicating whether the reference frame of the current frame is complete.

The reference status of the current frame is previously determined when the reference frame thereof is checked. When the reference frame is successfully decoded, the reference status of the current frame may be set to a complete reference frame; otherwise, the reference status is set to an incomplete reference frame.

2. Determining according to the reference status of the current frame whether the reference frame of the current frame is complete.

Figure 7:
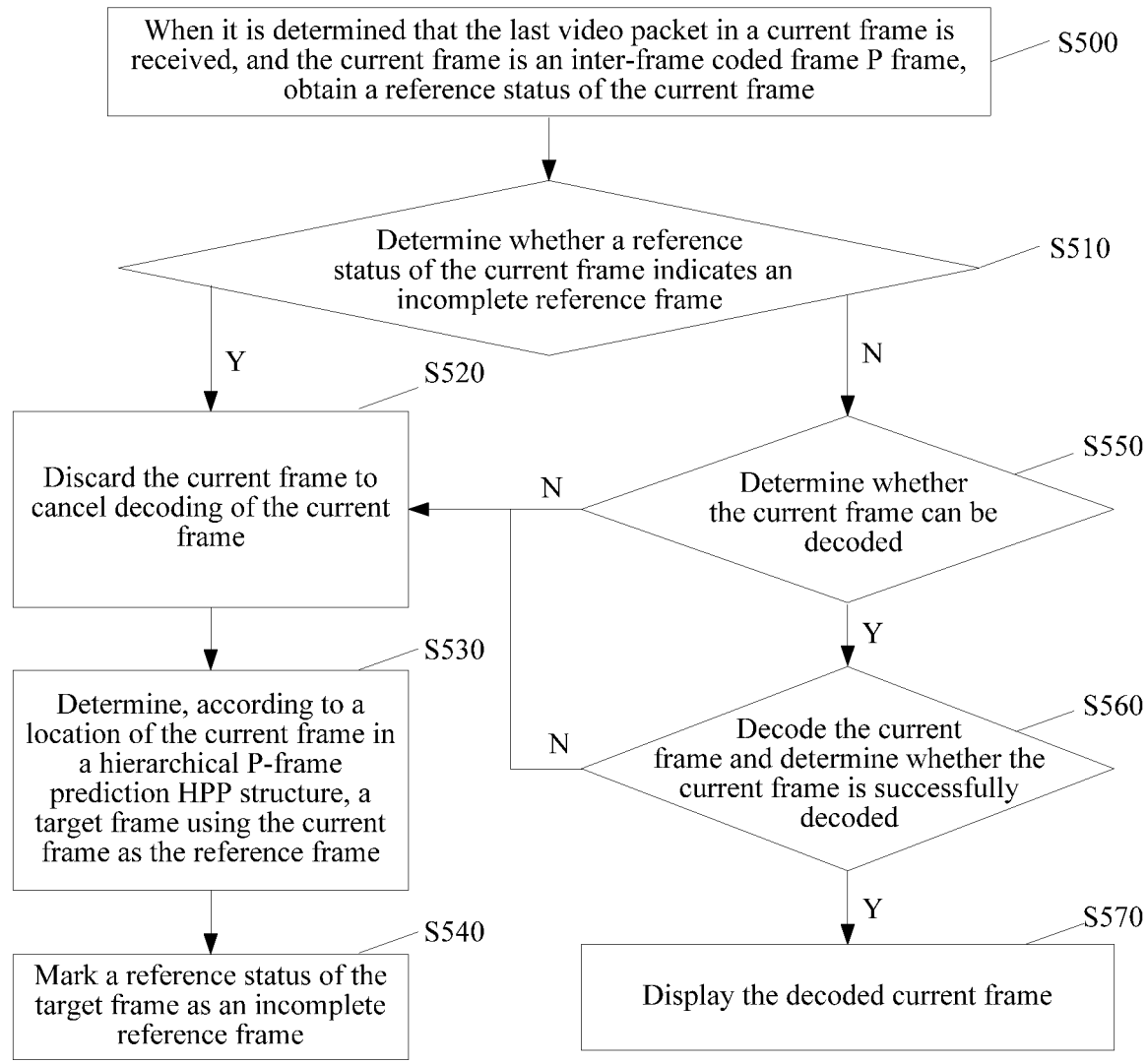
FIG. 7 is a flowchart of another video data processing method applied to a decoder side according to an embodiment of the present disclosure.

FIG. 7 is a flowchart of another video data processing method applied to a decoder side according to an embodiment of the present disclosure.

As shown in FIG. 7, the method includes:

Step S500: When it is determined that the last video packet in a current frame is received, and the current frame is an inter-frame coded frame P frame, obtaining a reference status of the current frame.

The reference status is used for indicating whether a reference frame of the current frame is incomplete.

Step S510: Determining whether a reference status of the current frame indicates an incomplete reference frame; if yes, performing steps S520 to S540; if not, performing steps S550 to S570.

Step S520: Discarding the current frame to cancel decoding of the current frame.

Step S530: Determining, according to a location of the current frame in a hierarchical P-frame prediction HPP structure, a target frame using the current frame as the reference frame.

Step S540: Marking a reference status of the target frame as an incomplete reference frame.

Step S550: Determining whether the current frame can be decoded; if not, performing step S520; if yes, performing step S560.

For example, an integrity check may be performed on video packets in the current frame that have been cached and it may be determined according to a check result whether the current frame can be decoded, when it is determined that the reference status of the current frame indicates that the reference frame is complete.

When it is determined that the current frame cannot be decoded, returning to perform operations of step S520 to S540.

Step S560: Decoding the current frame and determine whether the current frame is successfully decoded; if yes, performing step S570; if not, performing step S520.

Step S570: Displaying the decoded current frame.

For example, when it is determined that the current frame can be decoded, the current frame is decoded. Whether the current frame is successfully decoded is determined according to a decoding result. When the current frame is successfully decoded, the decoded current frame may be displayed.

When the current frame is not successfully decoded, return to perform operations of step S520 to S540.

In this case, a processing process when it is determined that the reference status of the current frame indicates a complete reference frame is further added. In an exemplary embodiment, when it is determined that the reference status of the current frame indicates a complete reference frame, whether the current frame can be decoded is further determined, and the current frame is decoded only when it is determined that the current frame can be decoded, further decreasing decoding processing on frames that cannot be decoded and shortening a video lag time.

Optionally, in step S550, the process of performing an integrity check on video packets in the current frame that have been cached and determining according to a check result whether the current frame can be decoded may include:

1) determining according to header information of video packets in the current frame whether the video packets in the current frame that have been cached can form a complete frame, and determining whether packet loss can be recovered when the video packets in the current frame that have been cached cannot form a complete frame; and 2) determining that the current frame can be decoded, when it is determined that the video packets in the current frame that have been cached can form a complete frame or when it is determined that packet loss can be recovered when the video packets in the current frame that have been cached cannot form a complete frame.

It may be understood that when it is determined that a complete frame cannot be formed, and packet loss cannot be recovered, it may be determined that the current frame cannot be decoded.

For example, as described above, a frame includes several video packets, and header information of each video packet can record a frame to which the video packet belongs and that the frame is an $i^{th}$ frame of total n video packets in the frame. Further, the header information may also record a quantity of redundancy packets in the frame. Based on the above, whether the video packets that have been cached can form a complete frame may be determined according to the video packets in the current frame that have been cached and the header information when packet recovery in the current frame ends. For example, the header information records total n video packets in the current frame. When a quantity of the video packets that have been cached is less than n, it indicates that a data packet in the current frame is lost, it is determined that a complete frame cannot be formed.

When it is determined that a complete frame cannot be formed, whether packet loss can be recovered may be further determined. For example, when it is determined that a quantity of lost packets in the current frame is less than or equal to a quantity of redundancy packets in the frame recorded in the header information, it may be determined that packet loss can be recovered; otherwise, it is determined that packet loss cannot be recovered.

Figure 8:
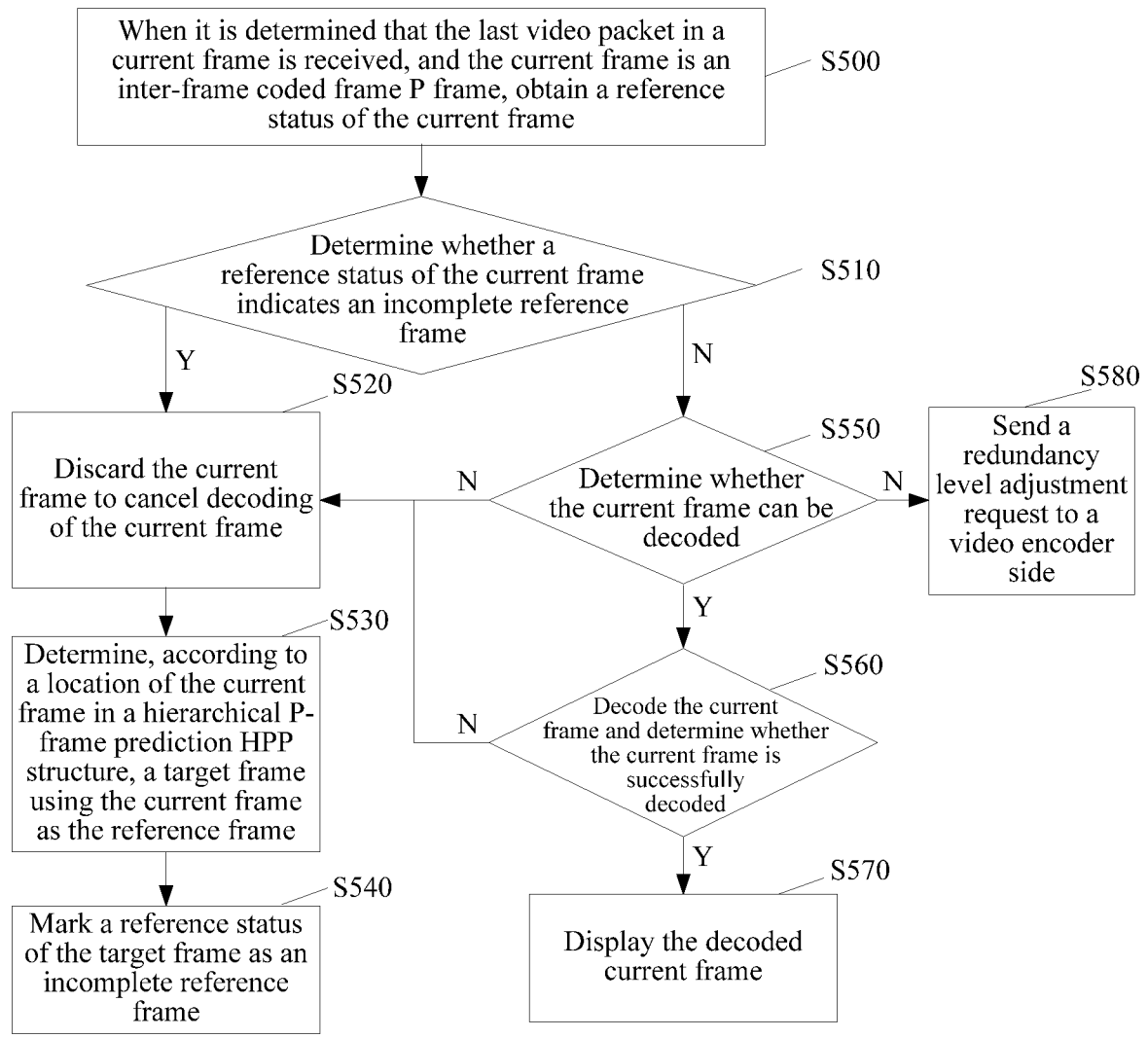
FIG. 8 is a flowchart of still another video data processing method applied to a decoder side according to an embodiment of the present disclosure.

Further, it can be known by comparing FIG. 7 and FIG. 8 that based on the embodiment corresponding to FIG. 7, when it is determined that the current frame cannot be decoded, step S580: send a redundancy level adjustment request to a video encoder side may be further added. The redundancy level adjustment request is sent to request the video encoder side to improve a quantity of sent redundancy packets.

For example, when it is determined that the current frame cannot be decoded, it indicates a severe packet loss situation that goes beyond an existing redundancy packet recovery capability. Therefore, the redundancy level adjustment request may be sent to the video encoder side, to request to improve the quantity of the sent redundancy packets.

For an adjustment policy of the encoder side after receiving the redundancy level adjustment request, refer to the foregoing related descriptions, and details are not described herein.

Figure 9:
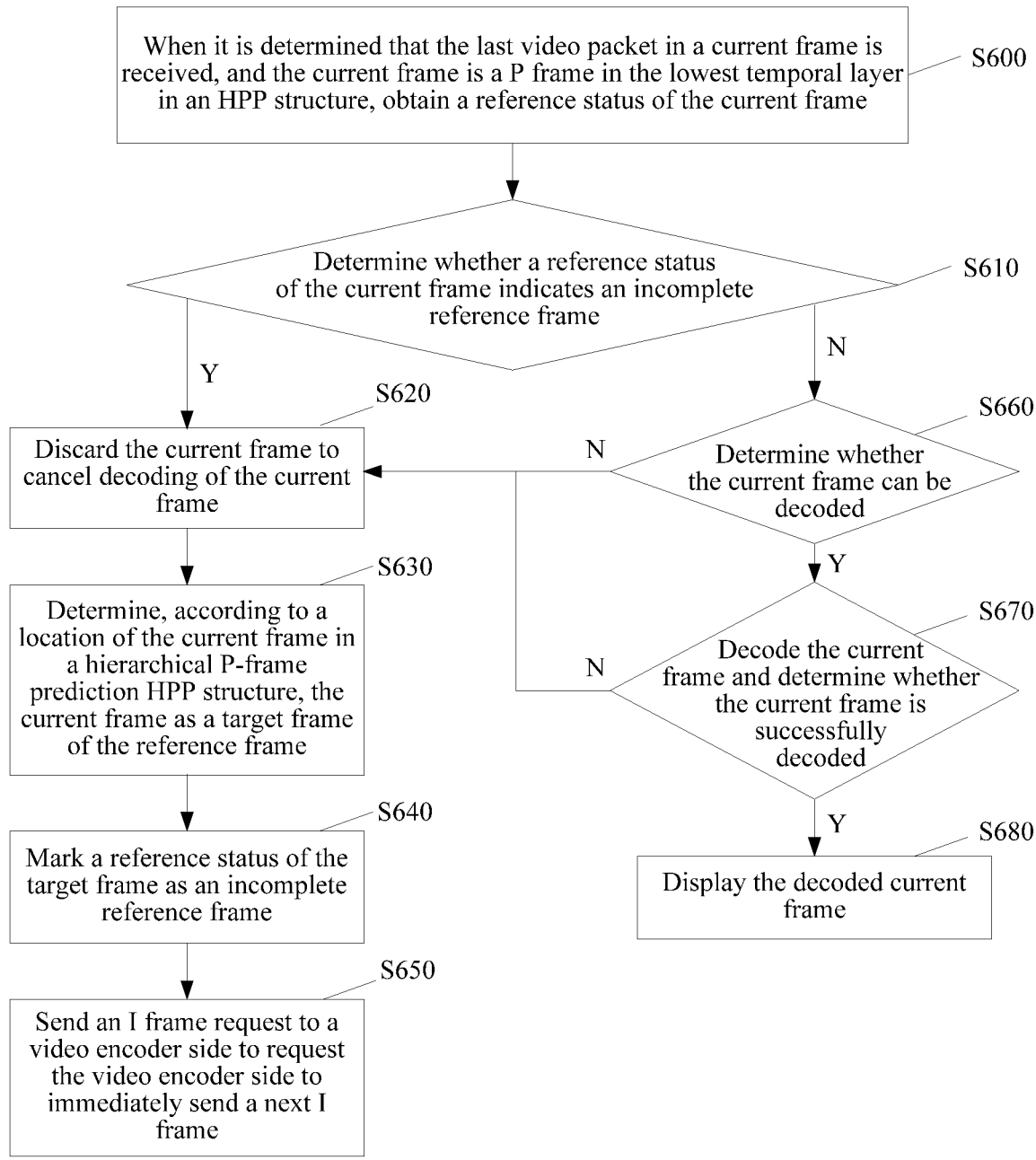
FIG. 9 is a flowchart of still another video data processing method applied to a decoder side according to an embodiment of the present disclosure.

Referring to FIG. 9, FIG. 9 is a flowchart of still another video data processing method applied to a decoder side according to an embodiment of the present disclosure.

As shown in FIG. 9, the method includes:

Step S600: When it is determined that the last video packet in a current frame is received, and the current frame is a P frame in the lowest temporal layer in an HPP structure, obtaining a reference status of the current frame.

The reference status is used for indicating whether a reference frame of the current frame is incomplete.

In this exemplary step, the current frame is a P frame and is in the lowest temporal layer in an HPP coding structure. Referring to FIG. 2, P4 and P8 are both P frames in the lowest temporal layer.

Step S610: Determining whether a reference status of the current frame indicates an incomplete reference frame; if yes, performing steps S620 to S640; if not, performing steps S650 to S680.

Step S620: Discarding the current frame to cancel decoding of the current frame.

Step S630: Determining, according to a location of the current frame in a hierarchical P-frame prediction HPP structure, the current frame as a target frame of the reference frame.

Step S640: Marking a reference status of the target frame as an incomplete reference frame.

Step S650: Sending an I frame request to a video encoder side to request the video encoder side to immediately send a next I frame.

For example, frames in the lowest temporal layer TL0 in the HPP structure cannot be decoded. As a result, a reference structure is broken. Frames that come after the current P frame between the current I frame and a next I frame cannot be decoded because reference frames are lost. Video lag cannot be avoided in this extreme situation. To shorten a lag time, the I frame request may be directly sent to the video encoder side, to request the video encoder side to immediately send the next I frame.

According to the processing means, a video lag time can be shortened to the largest extent.

Step S660: Determining whether the current frame can be decoded; if not, performing step S620; if yes, performing step S670.

For example, an integrity check may be performed on video packets in the current frame that have been cached and it may be determined according to a check result whether the current frame can be decoded, when it is determined that the reference status of the current frame indicates that the reference frame is complete.

When it is determined that the current frame cannot be decoded, returning to perform operations of step S620 to S650.

Step S670: Decoding the current frame and determine whether the current frame is successfully decoded; if yes, performing step S680; if not, performing step S620.

For example, when it is determined that the current frame is not successfully decoded, operations of steps S620 to S640 may be performed.

Step S680: Displaying the decoded current frame.

In an exemplary embodiment, a video data processing process when the current frame is a P frame in the lowest temporal layer in the HPP structure is described. Compared to the foregoing embodiments, when it is determined that the reference status of the current frame indicates that the reference frame is incomplete, or it is determined that the current frame cannot be decoded, or it is determined that the current frame is not successfully decoded, the operation of sending an I frame request to a video encoder side to request the video encoder side to immediately send a next I frame is added. According to this processing manner, a video lag time is shortened to the largest extent.

Figure 10:
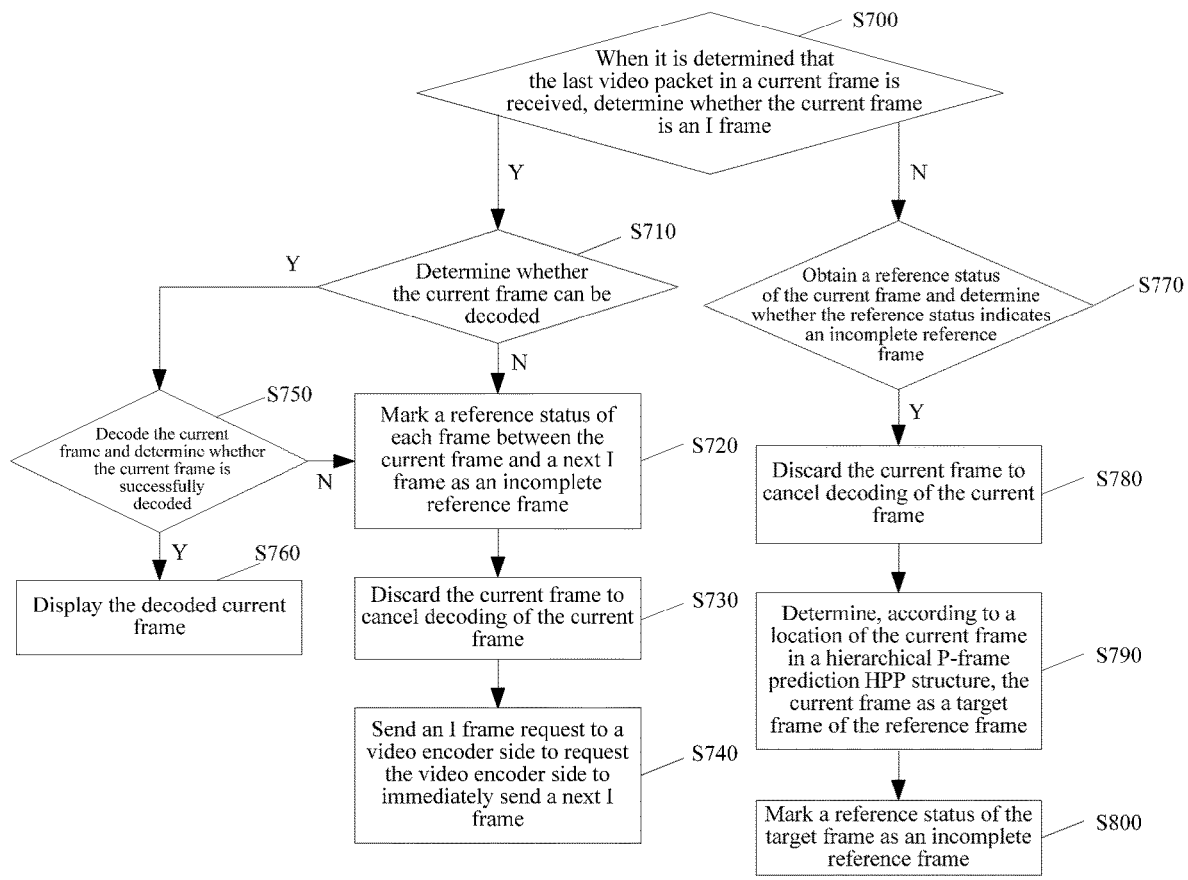
FIG. 10 is a flowchart of still another video data processing method applied to a decoder side according to an embodiment of the present disclosure.

FIG. 10 is a flowchart of still another video data processing method applied to a decoder side according to an embodiment of the present disclosure.

As shown in FIG. 10, the method includes:

Step S700: When it is determined that the last video packet in a current frame is received, determine whether the current frame is an I frame; if yes, performing steps S710 to S760; if not, performing steps S770 to S800.

For example, when the current frame is the I frame, the current frame has no reference frame. Step S710 may be performed to determine whether the current frame can be decoded. When the current frame is not the I frame, the current frame is a P frame, and step S770 may be performed to obtain a reference status of the current frame.

Step S710: Determining whether the current frame can be decoded; if not, performing steps S720 to S740; if yes, performing step S750.

For example, an integrity check may be performed on video packets in the current frame that have been cached and it may be determined according to a check result whether the current frame can be decoded.

For a detailed check process, refer to the foregoing related descriptions, and details are not provided herein.

Step S720: Marking a reference status of each frame between the current frame and a next I frame as an incomplete reference frame.

For example, when it is determined that the current I frame cannot be decoded, it indicates that a reference structure is broken, and P frames between the current I frame and the next I frame cannot be successfully decoded. Therefore, a reference status of each frame between the current frame and the next I frame is marked as an incomplete reference frame.

Step S730: Discarding the current frame to cancel decoding of the current frame.

Step S740: Sending an I frame request to a video encoder side to request the video encoder side to immediately send a next I frame.

For example, the I frame cannot be decoded. As a result, a reference structure is broken. Frames between the current I frame and the next I frame cannot be decoded because reference frames are lost. Video lag cannot be avoided in this extreme situation. To shorten a lag time, the I frame request may be directly sent to the video encoder side, to request the video encoder side to immediately send the next I frame.

According to the processing means, a video lag time can be shortened to the largest extent.

Step S750: Decoding the current frame and determine whether the current frame is successfully decoded; if yes, performing step S760; if not, performing steps S720 to S740.

For example, when it is determined that the current frame can be decoded in step S710, the current frame is decoded, and whether the current frame is successfully decoded according to a decoding result.

Step S760: Displaying the decoded current frame.

Step S770: Obtaining a reference status of the current frame and determine whether the reference status indicates an incomplete reference frame; if yes, performing step S780.

For example, when it is determined that the current frame is not the I frame in step S700, it indicates that the current frame has a reference frame. In this step, the reference status of the current frame is obtained. The reference status is used for indicating whether the reference frame of the current frame is incomplete.

Step S780: Discarding the current frame to cancel decoding of the current frame.

Step S790: Determining, according to a location of the current frame in a hierarchical P-frame prediction HPP structure, the current frame as a target frame of the reference frame.

Step S800: Marking a reference status of the target frame as an incomplete reference frame.

Compared with the foregoing embodiments, determining of whether the current frame is the I frame or P frame and an execution process when it is determined that the current frame is the I frame are added In an exemplary embodiment. That is, whether the current frame can be decoded and whether the current frame is successfully decoded are directly determined. When it is determined that the current frame cannot be decoded or that the current frame is not successfully decoded, the reference status of each frame between the current frame and the next I frame is marked as an incomplete reference frame. The current frame is discarded, and the I frame request is sent to the video encoder side, to request to immediately send the next I frame, thereby shortening a video lag time to the largest extent.

A video data processing apparatus provided in the embodiments of the present disclosure is described below. The video data processing apparatus described below may mutually correspondingly refer to the video data processing method described above.

Figure 11:
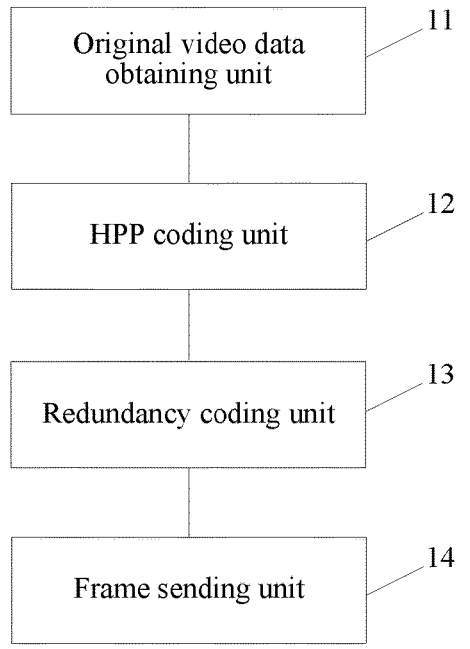
FIG. 11 is a schematic structural diagram of a video data processing apparatus applied to an encoder side according to an embodiment of the present disclosure.

FIG. 11 is a schematic structural diagram of a video data processing apparatus applied to an encoder side according to an embodiment of the present disclosure.

As shown in FIG. 11, the apparatus includes:

an original video data obtaining unit 11, configured to obtain original video data;

an HPP coding unit 12, configured to encode the original video data according to a hierarchical P-frame prediction HPP structure to obtain an HPP bitstream;

a redundancy coding unit 13, configured to redundancy-code the HPP bitstream according to a forward error correction FEC code, redundancy packet quantities in frames in the HPP bitstream decreasing from lower to higher temporal layers to which the frames belong in the HPP structure; and a frame sending unit 14, configured to sort the frames in the redundancy-coded HPP bitstream and sequentially send the sorted frames to a decoder side.

In the video data processing apparatus provided in the present disclosure, the encoder side encodes obtained original video data according to a hierarchical P-frame prediction HPP structure to obtain an HPP bitstream, redundancy-codes the HPP bitstream according to a forward error correction FEC code, redundancy packet quantities in frames in the HPP bitstream decreasing from lower to higher temporal layers to which the frames belong in the HPP structure, and at last, sequentially sends the frames in the redundancy-coded HPP bitstream to a decoder side. It can be learned from the above that in the present disclosure, the HPP coding structure is combined with FEC redundancy coding, and a redundancy packet is added to the HPP bitstream encoded according to the HPP coding structure. In addition, when redundancy packets are added, more redundancy packets are added to frames in lower temporal layers in the HPP structure, frames that are in lower temporal layers and that are of high importance are especially protected. In this manner, even if partial packet loss occurs in a data transmission process, the decoder side can also perform packet loss recovery by using the redundancy packet, thereby greatly improving a decoding success rate and reducing a video lag time.

Optionally, the apparatus in the present disclosure may further include:

a redundancy adjustment unit, configured to dynamically adjust a redundancy packet quantity in each subsequently to-be-sent frame in the HPP bitstream according to a set adjustment policy when a redundancy level adjustment request sent by the decoder side is received, the redundancy level adjustment request being generated by the decoder side when the decoder side performs an integrity check on a video packet in a received current frame and determines according to the check result that the current frame cannot be decoded.

Optionally, the redundancy adjustment unit may include:

a redundancy adjustment subunit, configured to adjust a redundancy packet quantity in each frame that belongs to a set temporal layer in the HPP bitstream; or, adjust a redundancy packet quantity in each frame that belongs to each temporal layer in the HPP bitstream according to a redundancy packet adjustment ratio corresponding to the temporal layer.

Optionally, the apparatus in the present disclosure may further include:

an I frame search unit, configured to search for a top ranked intra-frame coded frame, I frame, among the unsent frames in the HPP bitstream, when an I frame request sent by the decoder side is received; and an I frame sending unit, configured to send the sequentially first I frame that is found to the decoder side and sequentially send frames that come after the I frame.

Figure 12:
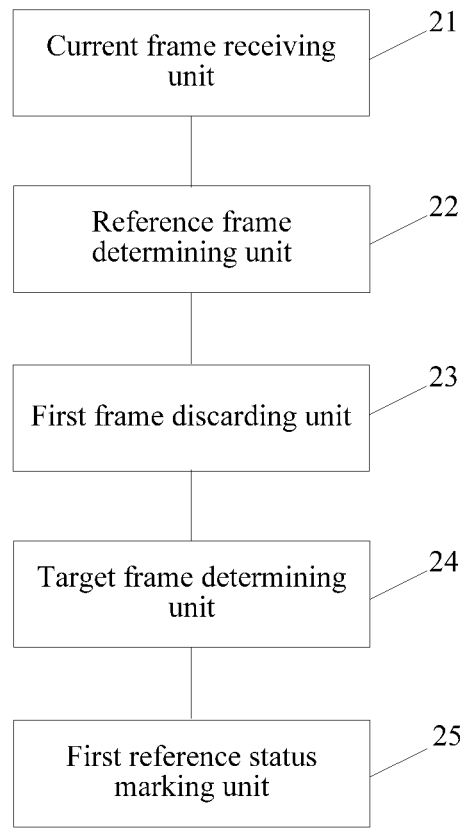
FIG. 12 is a schematic structural diagram of a video data processing apparatus applied to a decoder side according to an embodiment of the present disclosure.

FIG. 12 is a schematic structural diagram of a video data processing apparatus applied to a decoder side according to an embodiment of the present disclosure.

As shown in FIG. 12, the apparatus includes:

a current frame receiving unit 21, configured to receive a current frame sent by an encoder side, the current frame being a frame in a hierarchical P-frame prediction HPP bitstream obtained through coding by the encoder side according to an HPP structure;

a reference frame determining unit 22, configured to determine whether a reference frame of the current frame is complete, when it is determined that the current frame is an inter-frame coded frame P frame;

a first frame discarding unit 23, configured to discard the current frame to cancel decoding of the current frame, when the reference frame determining unit determines that the reference frame of the current frame is incomplete;

a target frame determining unit 24, configured to determine, according to a location of the current frame in the HPP structure, a target frame using the current frame as the reference frame; and a first reference status marking unit 25, configured to mark a reference status of the target frame as an incomplete reference frame.

In the video data processing apparatus provided in the present disclosure, the encoder side encodes obtained original video data according to a hierarchical P-frame prediction HPP structure to obtain an HPP bitstream, redundancy-codes the HPP bitstream according to a forward error correction FEC code, redundancy packet quantities in frames in the HPP bitstream decreasing from lower to higher temporal layers to which the frames belong in the HPP structure, and at last, sequentially sends the frames in the redundancy-coded HPP bitstream to a decoder side. It can be learned from the above that in the present disclosure, the HPP coding structure is combined with FEC redundancy coding, and a redundancy packet is added to the HPP bitstream encoded according to the HPP coding structure. In addition, when redundancy packets are added, more redundancy packets are added to frames in lower temporal layers in the HPP structure, frames that are in lower temporal layers and that are of high importance are especially protected. In this manner, even if partial packet loss occurs in a data transmission process, the decoder side can also perform packet loss recovery by using the redundancy packet, thereby greatly improving a decoding success rate and reducing a video lag time.

Optionally, reference frame determining unit may include:

a reference status obtaining unit, configured to obtain a reference status of the current frame, the reference status being used for indicating whether the reference frame of the current frame is complete; and a reference status determining unit, configured to determine according to the reference status of the current frame whether the reference frame of the current frame is complete.

Optionally, the current frame receiving unit may be for example configured to determine that the last video packet in the current frame is received.

Based on the above, the apparatus may further include:

a first video packet check unit, configured to perform an integrity check on video packets in the current frame that have been cached and determine according to a check result whether the current frame can be decoded, when the reference status of the current frame indicates that the reference frame is complete; and execute the first frame discarding unit when it is determined that the current frame cannot be decoded.

Further, the apparatus in the present disclosure may further include:

a first decoding unit, configured to decode the current frame when it is determined that the current frame can be decoded, execute a first display unit when the decoding is successful, and execute the first frame discarding unit when the decoding is not successful; and the first display unit, configured to display the decoded current frame.

Optionally, the current frame is in the lowest temporal layer in the HPP structure, and the apparatus may further include:

a first I frame request unit, configured to send an I frame request to a video encoder side to request the video encoder side to immediately send a next I frame, when it is determined that the reference status of the current frame indicates that the reference frame is incomplete, or that the current frame cannot be decoded, or that decoding of the current frame is not successful.

Optionally, the apparatus in the present disclosure may further include:

a redundancy level adjustment sending unit, configured to send a redundancy level adjustment request to a video encoder side to request the video encoder side to increase a quantity of redundancy packets to be sent, when it is determined according to the check result that the current frame cannot be decoded.

Optionally, the apparatus in the present disclosure may further include:

a second video packet check unit, configured to perform an integrity check on video packets in the current frame that have been cached and determining according to a check result whether the current frame can be decoded, when it is determined that the last video packet in the current frame is received and the current frame is an intra-frame coded frame I frame;

a second reference status marking unit, configured to mark a reference status of each frame between the current frame and a next I frame as an incomplete reference frame, when it is determined that the current frame cannot be decoded;

a second frame discarding unit, configured to discard the current frame to cancel decoding of the current frame; and a second I frame request unit, configured to send an I frame request to a video encoder side to request the video encoder side to immediately send the next I frame.

Optionally, the apparatus in the present disclosure may further include:

a second decoding unit, configured to decode the current frame when the current frame is an I frame and it is determined that the current frame can be decoded, execute a second display unit when the decoding is successful, and mark a reference status of each frame between the current frame and a next I frame as an incomplete reference frame when the decoding is not successful; and the second display unit, configured to display the decoded current frame.

Optionally, the first video packet check unit may include:

a framing and recovery determining unit, configured to: when the reference status of the current frame indicates that the reference frame is complete, determine according to header information of video packets in the current frame whether the video packets in the current frame that have been cached can form a complete frame, and determine whether packet loss can be recovered when the video packets in the current frame that have been cached cannot form a complete frame; and a decoding determining unit, configured to determining that the current frame can be decoded, when it is determined that the video packets in the current frame that have been cached can form a complete frame or when it is determined that packet loss can be recovered when the video packets in the current frame that have been cached cannot form a complete frame.

Figure 13:
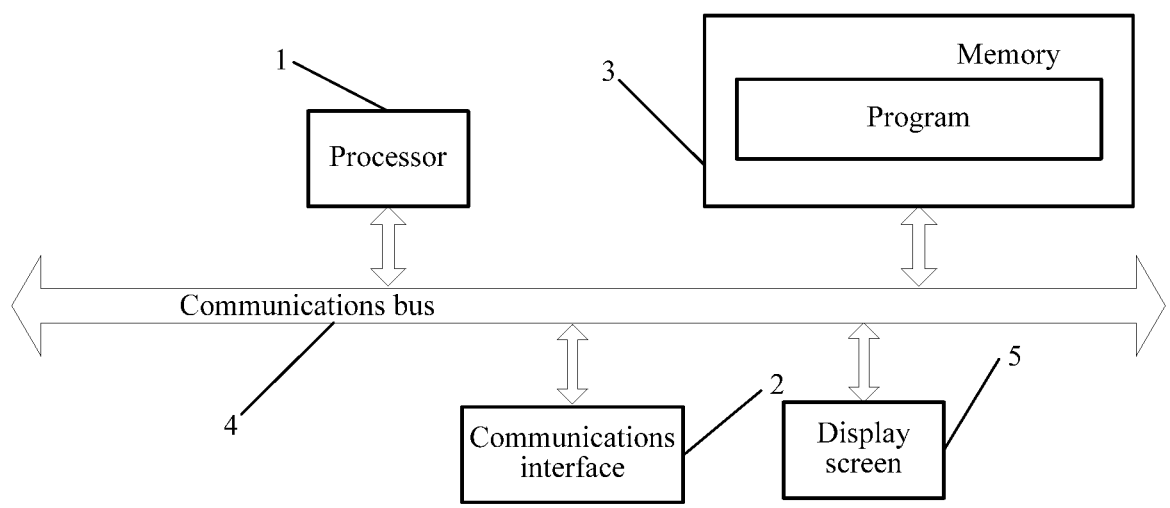
FIG. 13 is a schematic structural diagram of terminal hardware according to an embodiment of the present disclosure.

For hardware structures of the encoder side and the decoder side, referring to FIG. 13, FIG. 13 is a schematic structural diagram of terminal hardware according to an embodiment of the present disclosure.

As shown in FIG. 13, the terminal may include:

a processor 1, a communications interface 2, a memory 3, a communications bus 4, and/or a display screen 5.

Communication among the processor 1, communications interface 2, memory 3, and display screen 5 is implemented through the communications bus 4.

Optionally, the communication interface 2 may be an interface of a communications module, for example, an interface of a GSM module.

The processor 1 is configured to execute a program.

The memory 3 is configured to store a program.

The program may include program code, and the program code includes an operation instruction of the processor.

The processor 1 may be a central processing unit (CPU) or an application specific integrated circuit (ASIC) or may be configured as one or more integrated circuits for implementing the embodiments of the present disclosure.

The memory 3 may include a high-speed RAM memory, may also include a non-volatile memory, for example, at least one magnetic disk memory.

The program may be for example used for:
obtaining original video data;
encoding the original video data according to a hierarchical P-frame prediction HPP structure to obtain an HPP bitstream;
redundancy-coding the HPP bitstream according to a forward error correction FEC code, redundancy packet quantities in frames in the HPP bitstream decreasing from lower to higher temporal layers to which the frames belong in the HPP structure; and
sequentially sending the frames in the redundancy-coded HPP bitstream to a decoder side; or
receiving a current frame sent by an encoder side, the current frame being a frame in a hierarchical P-frame prediction HPP bitstream obtained through coding by the encoder side according to an HPP structure;
determining whether a reference frame of the current frame is complete, when it is determined that the current frame is an inter-frame coded frame P frame;
discarding the current frame to cancel decoding of the current frame, when the reference frame of the current frame is incomplete;
determining, according to a location of the current frame in the HPP structure, a target frame using the current frame as the reference frame; and
marking a reference status of the target frame as an incomplete reference frame.

It should be noted that the relational terms herein such as first and second are used only to distinguishing an entity or operation from another entity or operation, and do not require or imply any actual relationship or sequence between these entities or operations. Moreover, the terms "include", "comprise", and any other variant thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, method, object, or device that includes the elements.

It should be noted that the embodiments in this specification are all described in a progressive manner. Description of each of the embodiments focuses on differences from other embodiments, and reference may be made to each other for the same or similar parts among respective embodiments.

The above description of the disclosed embodiments enables persons skilled in the art to implement or use the present disclosure. Various modifications to these embodiments are obvious to persons skilled in the art, and the general principles defined in the present disclosure may be implemented in other embodiments without departing from the spirit and scope of the present disclosure. Therefore, the present disclosure is not limited to these embodiments illustrated in the present disclosure, but needs to conform to the broadest scope consistent with the principles and novel features disclosed in the present disclosure.

What is claimed is:

1. A non-transitory computer readable storage medium storing computer program instructions that, when being executed by a processor on a decoder side, cause the processor to perform:
receiving a current frame sent by an encoder side, the current frame being a frame in a hierarchical P-frame prediction (HPP) bitstream obtained through coding by the encoder side according to an HPP structure, the HPP bitstream corresponding to different temporal layers, frames in higher temporal layers being decoded with reference to frames in lower temporal layers, and neighboring frames being in different layers;
determining whether a reference frame of the current frame is complete, when it is determined that the current frame is an inter-frame coded frame P frame, comprising:
obtaining a reference status of the current frame, the reference status being used for indicating whether the reference frame of the current frame is complete; and
determining according to the reference status of the current frame whether the reference frame of the current frame is complete;
discarding the current frame to cancel decoding of the current frame, when the reference frame of the current frame is incomplete;
determining, according to a location of the current frame in the HPP structure, a target frame using the current frame as the reference frame; and
marking a reference status of the target frame as an incomplete reference frame,
wherein the computer program instructions further cause the processor to perform:
determining that the last video packet in the current frame is received;
performing an integrity check on video packets in the current frame that have been cached and determining according to a check result whether the current frame is able to be decoded, when the reference status of the current frame indicates that the reference frame is complete;
executing the operation of discarding the current frame to cancel decoding of the current frame, when it is determined that the current frame is unable to be decoded;
decoding the current frame when it is determined that the current frame is able to be decoded;
displaying the decoded current frame when the decoding is successful; and
executing the operation of discarding the current frame to cancel decoding of the current frame, when the decoding is unsuccessful; and
wherein the current frame is in the lowest temporal layer in the HPP structure, and the computer program instructions further cause the processor to perform:
sending an I frame request to an encoder side to request the encoder side to immediately send a next I frame, when it is determined that the reference status of the current frame indicates that the reference frame is incomplete, or that the current frame is unable to be decoded, or that decoding of the current frame is unsuccessful.

2. The storage medium according to claim 1, wherein the computer program instructions further cause the processor to perform:
sending a redundancy level adjustment request to a encoder side to request the encoder side to increase a quantity of redundancy packets to be sent, when it is determined according to the check result that the current frame is unable to be decoded.

3. The storage medium according to claim 1, wherein the computer program instructions further cause the processor to perform:
   performing an integrity check on video packets in the current frame that have been cached and determining according to a check result whether the current frame is able to be decoded, when it is determined that the last video packet in the current frame is received and the current frame is an intra-frame coded frame I frame;
   marking a reference status of each frame between the current frame and a next I frame as an incomplete reference frame, when it is determined that the current frame is unable to be decoded;
   discarding the current frame to cancel decoding of the current frame; and
   sending an I frame request to an encoder side to request the encoder side to immediately send the next I frame.

4. The storage medium according to claim 3, wherein the computer program instructions further cause the processor to perform:
   decoding the current frame when the current frame is an I frame and it is determined that the current frame is able to be decoded;
   displaying the decoded current frame when the decoding is successful; and
   executing the operation of marking a reference status of each frame between the current frame and a next I frame as an incomplete reference frame, when the decoding is unsuccessful.

5. The storage medium according to claim 1, wherein the performing an integrity check on video packets in the current frame that have been cached and determining according to a check result whether the current frame is able to be decoded comprise:
   determining according to header information of video packets in the current frame whether the video packets in the current frame that have been cached forms a complete frame, and determining whether packet loss is recovered when the video packets in the current frame that have been cached is unable to form a complete frame; and
   determining that the current frame is able to be decoded, when it is determined that the video packets in the current frame that have been cached forms a complete frame or when it is determined that packet loss is recovered when the video packets in the current frame that have been cached is unable to form a complete frame.

6. A video data processing apparatus, applied to a decoder side, the apparatus comprising:
   a memory, configured to store program for a video data processing method, applied to the decoder side; and
   a processor, coupled to the memory and, when executing the program, configured to:
      receive a current frame sent by an encoder side, the current frame being a frame in a hierarchical P-frame prediction HPP bitstream obtained through coding by the encoder side according to an HPP structure, the HPP bitstream corresponding to different temporal layers, frames in higher temporal layers being decoded with reference to frames in lower temporal layers, and neighboring frames being in different layers;
      determine whether a reference frame of the current frame is complete, when it is determined that the current frame is an inter-frame coded frame P frame;
      discard the current frame to cancel decoding of the current frame, when the reference frame determining unit determines that the reference frame of the current frame is incomplete;
      determine, according to a location of the current frame in the HPP structure, a target frame using the current frame as the reference frame; and
      mark a reference status of the target frame as an incomplete reference frame,
   wherein the processor is further configured to:
      obtain a reference status of the current frame, the reference status being used for indicating whether the reference frame of the current frame is complete; and
      determine according to the reference status of the current frame whether the reference frame of the current frame is complete;
   determine that the last video packet in the current frame is received;
   perform an integrity check on video packets in the current frame that have been cached and determine according to a check result whether the current frame is able to be decoded, when the reference status of the current frame indicates that the reference frame is complete; and execute the first frame discarding unit when it is determined that the current frame is unable to be decoded:
      decode the current frame when it is determined that the current frame is able to be decoded, execute a first display unit when the decoding is successful, and execute the first frame discarding unit when the decoding is unsuccessful; and
      display the decoded current frame; and
   wherein the current frame is in the lowest temporal layer in the HPP structure, and the processor is further configured to: send an I frame request to an encoder side to request the encoder side to immediately send a next I frame, when it is determined that the reference status of the current frame indicates that the reference frame is incomplete, or that the current frame is unable to be decoded, or that decoding of the current frame is unsuccessful.

7. The apparatus according to claim 6, wherein the processor is further configured to:
   send a redundancy level adjustment request to an encoder side to request the encoder side to increase a quantity of redundancy packets to be sent, when it is determined according to the check result that the current frame is unable to be decoded.

8. The apparatus according to claim 6, wherein the processor is further configured to:
   perform an integrity check on video packets in the current frame that have been cached and determining according to a check result whether the current frame is able to be decoded, when it is determined that the last video packet in the current frame is received and the current frame is an intra-frame coded frame I frame;
   mark a reference status of each frame between the current frame and a next I frame as an incomplete reference frame, when it is determined that the current frame is unable to be decoded;
   discard the current frame to cancel decoding of the current frame; and send an I frame request to an encoder side to request the encoder side to immediately send the next I frame.

\* \* \* \* \*